(12) United States Patent
Liao et al.

(10) Patent No.: US 12,261,705 B2
(45) Date of Patent: Mar. 25, 2025

(54) COMPUTING DEVICE AND COMPUTING METHOD FOR COMPUTING PACKET TRANSMISSION TIME

(71) Applicant: Realtek Semiconductor Corp., HsinChu (TW)

(72) Inventors: Chien-Hsun Liao, HsinChu (TW); Wei-Hsuan Chang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 18/373,268

(22) Filed: Sep. 26, 2023

(65) Prior Publication Data

US 2024/0137165 A1 Apr. 25, 2024

(30) Foreign Application Priority Data

Oct. 18, 2022 (TW) ................................. 111139462

(51) Int. Cl.
*H04L 1/20* (2006.01)
*H03M 13/00* (2006.01)
*H04L 1/18* (2023.01)
*H04L 1/1867* (2023.01)

(52) U.S. Cl.
CPC ............ *H04L 1/203* (2013.01); *H04L 1/1887* (2013.01)

(58) Field of Classification Search
CPC ...... H04L 1/203; H04L 1/1887; H04W 28/00; H04W 28/02
See application file for complete search history.

(56) References Cited

U.S. PATENT DOCUMENTS

| 10,602,367 | B2* | 3/2020 | Abeysekera | .......... H04W 24/02 |
| 11,792,616 | B2* | 10/2023 | Mueck | .............. H04W 74/0816 370/329 |
| 11,800,572 | B2* | 10/2023 | Xue | ........................ H04L 65/80 |
| 2021/0385865 | A1* | 12/2021 | Mueck | ................... H04W 80/02 |
| 2022/0201535 | A1* | 6/2022 | Chay | ..................... H04L 1/0002 |

* cited by examiner

*Primary Examiner* — Justin R Knapp
(74) *Attorney, Agent, or Firm* — Winston Hsu

(57) ABSTRACT

A computing device includes: a storage circuit, for storing an arbitration interframe space (AIFS) time, at least one expected value of at least one backoff time, a preamble time, a short interframe space (SIFS) time and an acknowledgement (ACK) time; a first computing circuit, for computing a payload time according to a packet length and a packet rate; a second computing circuit, coupled to the storage circuit and the first computing circuit, for computing at least one packet transmission time according to the AIFS time, the at least one expected value of the at least one backoff time, the preamble time, the SIFS time, the ACK time and the payload time; and a third computing circuit, coupled to the second computing circuit, for computing a total packet transmission time according to the at least one packet transmission time and an estimated packet error rate.

18 Claims, 3 Drawing Sheets

COMPUTING DEVICE AND COMPUTING METHOD FOR COMPUTING PACKET TRANSMISSION TIME

BACKGROUND OF THE INVENTION

1. Field of the Invention

The present invention relates to a computing device and a computing method used in a communication system, and more particularly, to a computing device and a computing method for computing a packet transmission time.

2. Description of the Prior Art

In a wireless communication system, a transmitter transmits a packet to a receiver according to multiple data rates defined in a communication standard (e.g., IEEE 802.11). In the prior art, the transmitter predicts a throughput according to the data rates and an estimated packet error rate, in order to select a better data rate. However, the transmitter does not consider a packet retransmission. Thus, how to compute a packet transmission time to select a best data rate to obtain a high throughput or a low latency is an important problem to be solved.

SUMMARY OF THE INVENTION

The present invention provides a computing device and method to solve the abovementioned problem.

A computing device comprises: a storage circuit, for storing an arbitration interframe space (AIFS) time, at least one expected value of at least one backoff time, a preamble time, a short interframe space (SIFS) time and an acknowledgement (ACK) time; a first computing circuit, for computing a payload time according to a packet length and a packet rate; a second computing circuit, coupled to the storage circuit and the first computing circuit, for computing at least one packet transmission time according to the AIFS time, the at least one expected value of the at least one backoff time, the preamble time, the SIFS time, the ACK time and the payload time; and a third computing circuit, coupled to the second computing circuit, for computing a total packet transmission time according to the at least one packet transmission time and an estimated packet error rate.

A computing method comprises: storing an arbitration interframe space (AIFS) time, at least one expected value of at least one backoff time, a preamble time, a short interframe space (SIFS) time and an acknowledgement (ACK) time; computing a payload time according to a packet length and a packet rate; computing at least one packet transmission time according to the AIFS time, the at least one expected value of the at least one backoff time, the preamble time, the SIFS time, the ACK time and the payload time; and computing a total packet transmission time according to the at least one packet transmission time and an estimated packet error rate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
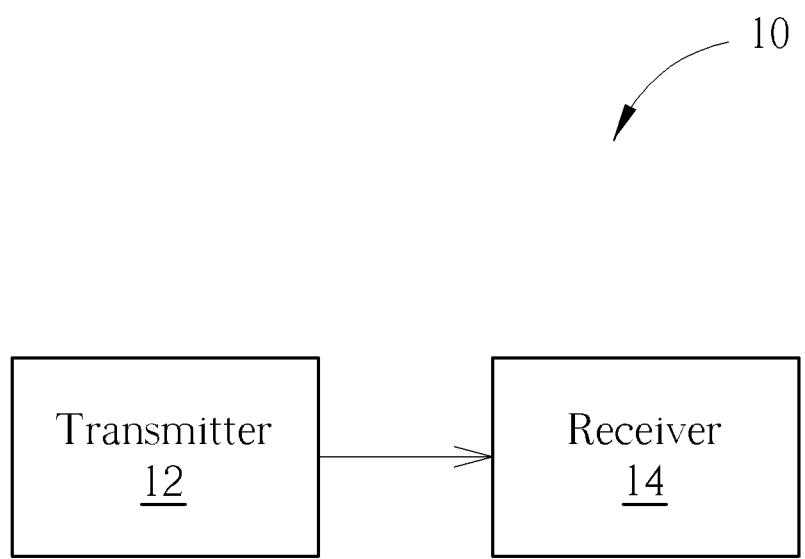
FIG. 1 is a schematic diagram of a communication system according to an embodiment of the present invention.

FIG. 1 is a schematic diagram of a communication system 10 according to an embodiment of the present invention. The communication system 10 may be any communication system using an orthogonal frequency-division multiplexing (OFDM) technique (also termed as a discrete multi-tone modulation (DMT) technique), and is composed of a transmitter 12 and a receiver 14. The communication system 10 may be any wired communication system such as an asymmetric digital subscriber line (ADSL) system, a power line communication (PLC) system or an Ethernet over coax (EOC) but is not limited herein. The communication system 10 may be any wireless communication system such as a wireless local area network (WLAN) a Digital Video Broadcasting (DVB) system, a Long Term Evolution (LTE) system, a Long Term Evolution-advanced (LTE-A) system or a 5th generation (5G) system, but is not limited herein. In addition, the transmitter 12 and the receiver 14 may be installed in a mobile phone, a laptop, etc., but this is not limited herein.

The transmitter 12 may predict a throughput according to a data rate and an estimated packet error rate (e.g. an average of packet error rates) The throughput may be expressed as follows:

$$\text{throughput}=r\times(1-\text{PER}_{estimated}) \quad \text{(Eq. 1)}$$

wherein throughput is the throughput, r is the data rate and $\text{PER}_{estimated}$ is the estimated packet error rate. In a case where the data rate r is 6, 9, 12, 18, 24, 36, 48 or 54 megabits per second (Mbps) the throughput, the data rate and the estimated packet error rate can be summarized as shown in Table 1.

TABLE 1

| Data rate (Mbps) | Packet error rate of last 5 times (%) | Estimated packet error rate (average) (%) | Throughput (Mbps) |
|---|---|---|---|
| 6 | 0, 0, 0, 0, 0 | 0 | 6 |
| 9 | 1, 3, 2, 4, 0 | 2 | 8.82 |
| 12 | 5, 2, 1, 4, 3 | 3 | 11.64 |
| 18 | 5, 5, 2, 2, 6 | 4 | 17.28 |
| 24 | 23, 10, 30, 20, 17 | 20 | 19.2 |
| 36 | 35, 50, 30, 60, 25 | 40 | 21.6 |
| 48 | 96, 100, 96, 100, 100 | 95 | 2.4 |
| 54 | 100, 100, 100, 100, 100 | 100 | 0 |

The transmitter 12 may select the data rate 36 Mbps to transmit the packet according to Table 1, in order to obtain the highest throughput.

Figure 2:
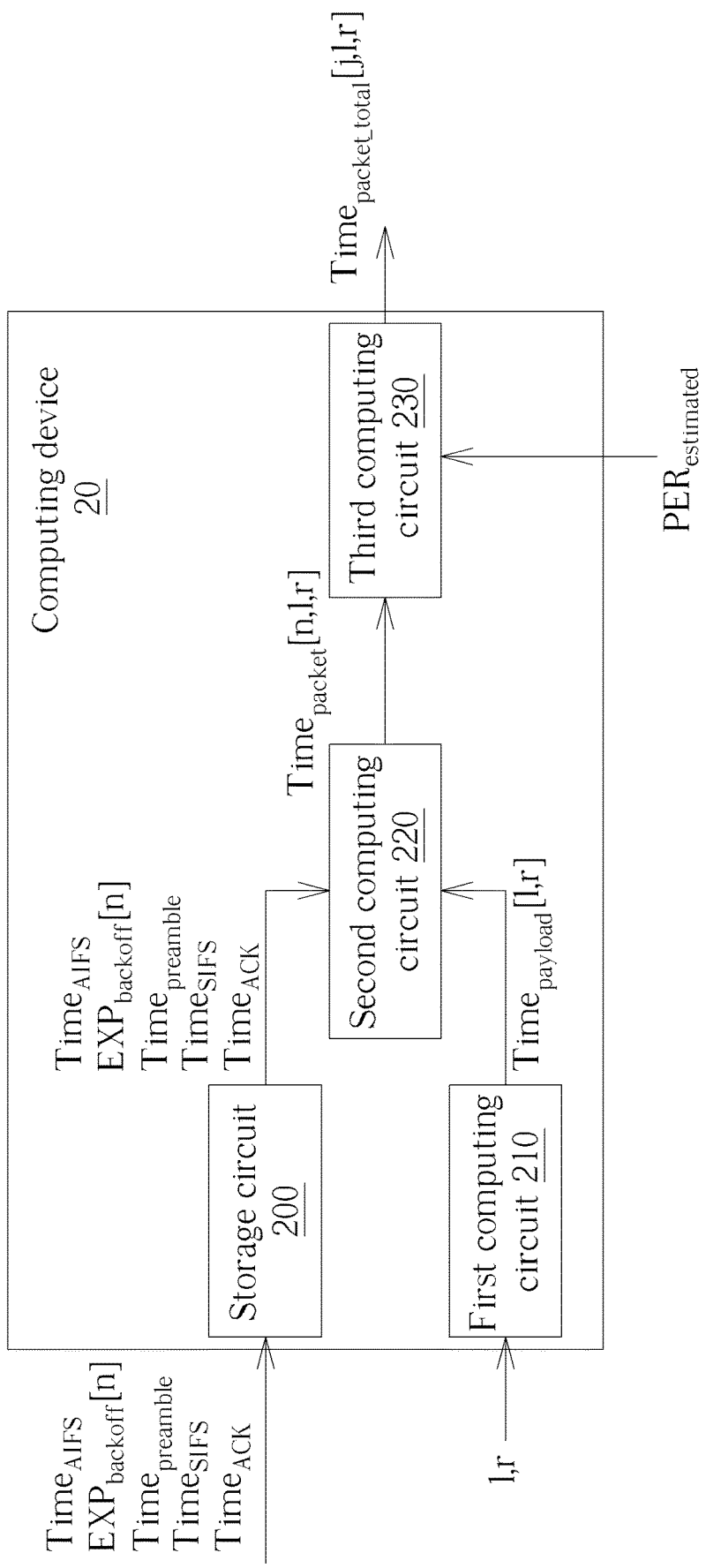
FIG. 2 is a schematic diagram of a computing device according to an embodiment of the present invention.

FIG. 2 is a schematic diagram of a computing device 20 according to an embodiment of the present invention. The computing device 20 may be utilized in the transmitter 12 of FIG. 1, for computing a packet transmission time. The computing device 20 comprises a storage circuit 200, a first computing circuit 210, a second computing circuit 220 and a third computing circuit 230. In detail, the storage circuit 200 is configured for storing an arbitration interframe space (AIFS) time $\text{Time}_{AIFS}$, at least one expected value $\text{EXP}_{backoff}[n]$ of at least one backoff time $\text{Time}_{backoff}[n]$ (n is a number of transmissions of a packet) a preamble time $\text{Time}_{preamble}$, a short interframe space (SIFS) time $\text{Time}_{SIFS}$ and an acknowledgement (ACK) time $Time_{ACK}$. The first computing circuit 210 is configured for computing a payload time $Time_{payload}[l, r]$ according to a packet length l and a packet rate r (e.g., a data rate defined in a communication standard) The second computing circuit 220 is coupled to the storage circuit 200 and the first computing circuit 210, and is configured for computing at least one packet transmission time $Time_{packet}[n, l, r]$ according to the AIFS time $Time_{AIFS}$, the at least one expected value $EXP_{backoff}[n]$ of the at least one backoff time $Time_{backoff}[n]$, the preamble time $Time_{preamble}$, the SIFS time $Time_{SIFS}$, the ACK time $Time_{ACK}$ and the payload time $Time_{payload}$. The third computing circuit 230 is coupled to the second computing circuit 220, and is configured for computing a total packet transmission time $Time_{packet\_total}[j, l, r]$ according to the at least one packet transmission time $Time_{packet}[n, l, r]$ and an estimated packet error rate $PER_{estimated}$ (j is a maximum number of transmissions of the packet).

In one example, the AIFS time $Time_{AIFS}$ is a waiting time interval before transmitting the packet. In one example, the AIFS time $Time_{AIFS}$ is a predefined value, and is defined in a communication standard (e.g., IEEE 802.11) In one example, the AIFS time $Time_{AIFS}$ is related to a frequency band for transmitting the packet. Different frequency bands may have different AIFS times $Time_{AIFS}$.

In one example, the at least one backoff time $Time_{backoff}[n]$ is at least one waiting time interval before transmitting a packet (and after the AIFS time $Time_{AIFS}$). In one example, the at least one backoff time $Time_{backoff}[n]$ is at least one random variable with a probability distribution (e.g., a uniform distribution) In one example, the at least one expected value $EXP_{backoff}[n]$ of the at least one backoff time $Time_{backoff}[n]$ is at least one median of the at least one backoff time $Time_{backoff}[n]$.

Table 2 illustrates an example of the backoff time $Time_{backoff}[n]$ and the expected value $EXP_{backoff}[n]$ for the n-th transmission of the packet. As n increases, a range of the backoff time $Time_{backoff}[n]$ and the expected value $EXP_{backoff}[n]$ increase. That is, compared with the case of transmitting the packet for the first time (n=1) the transmitter 12 which retransmits the packet (n>1) may wait for a longer time. The more the number of retransmissions, the longer the transmitter 12 may wait.

TABLE 2

| n-th transmission of packet | Backoff time (microsecond (µs)) | Expected value (µs) |
|---|---|---|
| n = 1 | 0-135 | 67.5 |
| n = 2 | 0-279 | 139.5 |
| n = 3 | 0-567 | 283.5 |
| n = 4 | 0-1143 | 571.5 |
| n = 5 | 0-2295 | 1147.5 |
| n = 6 | 0-4599 | 2299.5 |
| n ≥ 7 | 0-9207 | 4603.5 |

In one example, the preamble time $Time_{preamble}$ is a predefined value, and is defined in a communication standard (e.g., IEEE 802.11). In one example, the SIFS time $Time_{SIFS}$ is a time interval for the transmitter 12 to wait for an ACK from the receiver 14 after transmitting the packet. In one example, the SIFS time $Time_{SIFS}$ is a predefined value, and is defined in a communication standard (e.g., IEEE 802.11). In one example, the ACK time $Time_{ACK}$ is a time interval for receiving an ACK (e.g., by the transmitter 12). In one example, the ACK time $Time_{ACK}$ is a predefined value, and is defined in a communication standard (e.g., IEEE 802.11).

In one example, the estimated packet error rate $PER_{estimated}$ is a function of a plurality of packet error rates. For example, the function may be an average of the plurality of packet error rates or a maximum of the plurality of packet error rates.

The following example is used for illustrating how the computing device 20 computes the total packet transmission time. First, the storage circuit 200 stores the AIFS time $Time_{AIFS}$ as 43 µs, the preamble time $Time_{preamble}$ as 20 µs, the SIFS time $Time_{SIFS}$ as 16 µs, the ACK time $Time_{ACK}$ as 44 µs and the expected values $EXP_{backoff}[n]$ of the backoff times $Time_{backoff}[n]$ as shown in Table 2. The first computing circuit computes the payload time $Time_{payload}[l, r]$ according to the packet length l and the packet rate r as follows:

$$Time_{payload}[l, r] = \frac{l}{r} \qquad (Eq. 2)$$

For example, the packet length l is 1538 bytes and the packet rate r is 6 Mbps. The payload time $Time_{payload}[l, r]$ is computed as follows:

$$Time_{payload}[l, r] = \frac{1538 \times 8}{6 \times 10^6} = 2051 \, \mu s \qquad (Eq. 3)$$

Then, the second computing circuit 220 computes the at least one packet transmission time $Time_{packet}[n, l, r]$ as follows:

$$Time_{packet}[n,l,r]=Time_{AIFS}+EXP_{backoff}[n]+Time_{preamble}+Time_{payload}[l,r]+Time_{SIFS}+Time_{ACK} \qquad (Eq. 4)$$

It is assumed that the packet length l is 1538 bytes. In the case where the packet rate r is 6, 9, 12, 18, 24, 36, 48 or 54 Mbps and n is 1, 2, 3, 4, or 5, the packet transmission time $Time_{packet}[n, l, r]$ can be summarized as shown in Table 3.

TABLE 3

| Packet rate (Mbps) | Packet transmission time with n = 1 (µs) | Packet transmission time with n = 2 (µs) | Packet transmission time with n = 3 (µs) | Packet transmission time with n = 4 (µs) | Packet transmission time with n = 5 (µs) |
|---|---|---|---|---|---|
| 6 | 2241 | 2313 | 2457 | 2745 | 3321 |
| 9 | 1558 | 1630 | 1774 | 2062 | 2638 |
| 12 | 1216 | 1288 | 1432 | 1720 | 2296 |
| 18 | 874 | 946 | 1090 | 1378 | 1954 |
| 24 | 703 | 775 | 919 | 1207 | 1783 |
| 36 | 532 | 604 | 748 | 1036 | 1612 |
| 48 | 447 | 519 | 663 | 951 | 1527 |
| 54 | 418 | 490 | 634 | 922 | 1498 |

Then, the third computing circuit 230 computes the total packet transmission time $Time_{packet\_total}[j, l, r]$ according to the packet transmission times $Time_{packet}[n, l, r]$ and the estimated packet error rate $PER_{estimated}$ as follows:

$$Time_{packet\_total}[j,l,r]=\Sigma_{i=1}^{j}Time_{packet}[i,l,r] \times PER_{estimate}^{i-1} \qquad (Eq. 5)$$

wherein j is a maximum number of transmissions of the packet, l is the packet length and r is the data rate.

It is assumed that the estimated packet error rate $PER_{estimated}$ is the average of the packet error rates and the packet length l is 1538 bytes. In the case where the packet rate r is 6, 9, 12, 18, 24, 36, 48 or 54 Mbps and j is 8 or 16, the estimated packet error rate $PER_{estimated}$ and the total packet transmission time $Time_{packet\_total}[j, l, r]$ can be summarized as shown in Table 4.

TABLE 4

| Packet rate (Mbps) | Packet error rate of last 5 times (%) | Estimated packet error rate (average) (%) | Total packet transmission time with j = 8 (μs) | Total packet transmission time with j = 16 (μs) |
|---|---|---|---|---|
| 6 | 0, 0, 0, 0, 0 | 0 | 2241 | 2241 |
| 9 | 1, 3, 2, 4, 0 | 2 | 1591 | 1591 |
| 12 | 5, 2, 1, 4, 3 | 3 | 1256 | 1256 |
| 18 | 5, 5, 2, 2, 6 | 4 | 914 | 914 |
| 24 | 23, 10, 30, 20, 17 | 20 | 909 | 909 |
| 36 | 35, 50, 30, 60, 25 | 40 | 1059 | 1064 |
| 48 | 96, 100, 96, 100, 100 | 95 | 12812 | 35065 |
| 54 | 100, 100, 100, 100, 100 | 100 | 16523 | 56158 |

According to Table 4, the same packet can be transmitted 8 times or 16 times at most, and the time required for the transmitter 12 to transmit the packet at the data rate 24 Mbps is the shortest. That is, compared with the case where the packet retransmission is not considered (i.e., Table 1), in the case of the packet retransmission, the transmitter 12 obtains a greater throughput by selecting the data rate 24 Mbps rather than 36 Mbps.

Assuming that the estimated packet error rate $PER_{estimated}$ is the maximum of the packet error rate and other parameters are the same as in Table 4, the estimated packet error rate $PER_{estimated}$ and the total packet transmission time $Time_{packet\_total}[j, l, r]$ can be summarized as shown in Table 5.

TABLE 5

| Packet rate (Mbps) | Packet error rate of last 5 times (%) | Estimated packet error rate (maximum) (%) | Total packet transmission time with j = 8 (μs) | Total packet transmission time with j = 16 (μs) |
|---|---|---|---|---|
| 6 | 0, 0, 0, 0, 0 | 0 | 2241 | 2241 |
| 9 | 1, 3, 2, 4, 0 | 4 | 1626 | 1626 |
| 12 | 5, 2, 1, 4, 3 | 5 | 1284 | 1284 |
| 18 | 5, 5, 2, 2, 6 | 6 | 935 | 935 |
| 24 | 23, 10, 30, 20, 17 | 30 | 1078 | 1078 |
| 36 | 35, 50, 30, 60, 25 | 60 | 2190 | 2400 |
| 48 | 96, 100, 96, 100, 100 | 100 | 16751 | 56613 |
| 54 | 100, 100, 100, 100, 100 | 100 | 16523 | 56158 |

According to Table 5 (i.e., considering the worst case of transmitting a packet), the same packet can be transmitted 8 times or 16 times at most, and the time required for the transmitter 12 to transmit the packet at the data rate 18 Mbps is the shortest. That is, compared with the case where the packet retransmission is not considered (i.e., Table 1), in the case of the packet retransmission, the transmitter 12 may obtain a lower latency by selecting the data rate 18 Mbps rather than 36 Mbps.

Figure 3:
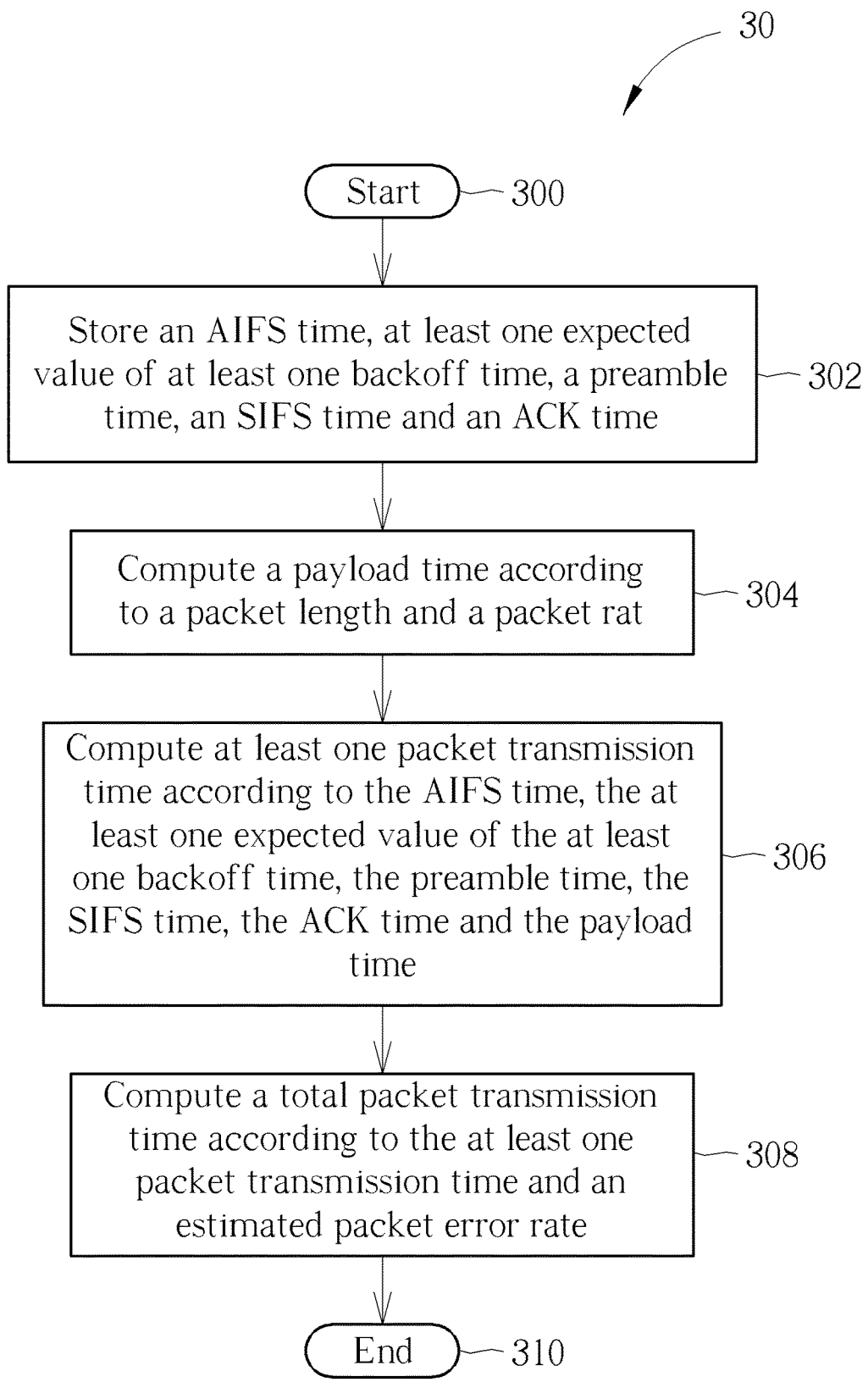
FIG. 3 is a flowchart of a computing method according to an embodiment of the present invention.

Operations of the computing device 20 in the above examples can be summarized into a process 30 shown in FIG. 3. The process 30 may be utilized in the transmitter 12 of FIG. 1. In FIG. 3, a computing method performed by the computing device 20 includes the following steps:

Step 300: Start.

Step 302: Store an AIFS time, at least one expected value of at least one backoff time, a preamble time, an SIFS time and an ACK time.

Step 304: Compute a payload time according to a packet length and a packet rate.

Step 306: Compute at least one packet transmission time according to the AIFS time, the at least one expected value of the at least one backoff time, the preamble time, the SIFS time, the ACK time and the payload time.

Step 308: Compute a total packet transmission time according to the at least one packet transmission time and an estimated packet error rate.

Step 310: End.

Detailed description and variations of the process 30 can be known by referring to the previous description, and are not narrated herein.

It should be noted that realizations of the computing device 20 (including the storage circuit 200, the first computing circuit 210, the second computing circuit 220 and the third computing circuit 230) are various. For example, the devices/circuits mentioned above may be integrated into one or more devices/circuits. In addition, the computing device 20 and the circuits in the computing device 20 may be realized by hardware (e.g. circuits), software, firmware (known as a combination of a hardware device, computer instructions and data that reside as read-only software on the hardware device), an electronic system or a combination of the devices mentioned above, but are not limited herein.

To sum up, the present invention provides a computing device and a computing method. In the case where a transmitter retransmits a packet, the computing device computes a total packet transmission time according to different estimated packet error rates. Compared with the prior art, the transmitter of the present invention selects a better data rate to obtain a high throughput or a low latency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computing device for computing a packet transmission time to select a data rate to improve a performance of the computing device, comprising:
   a storage circuit, for storing an arbitration interframe space (AIFS) time, at least one expected value of at least one backoff time, a preamble time, a short interframe space (SIFS) time and an acknowledgement (ACK) time;
   a first computing circuit, for computing a payload time according to a packet length and a packet rate;
   a second computing circuit, coupled to the storage circuit and the first computing circuit, for computing at least one packet transmission time according to the AIFS time, the at least one expected value of the at least one backoff time, the preamble time, the SIFS time, the ACK time and the payload time; and
   a third computing circuit, coupled to the second computing circuit, for computing a total packet transmission time according to the at least one packet transmission time and an estimated packet error rate.

2. The computing device of claim 1, wherein the AIFS time is a waiting time interval before transmitting a packet, and is a predefined value.

3. The computing device of claim 1, wherein the at least one backoff time is at least one waiting time interval before transmitting a packet, and is at least one random variable with a probability distribution.

4. The computing device of claim 1, wherein the at least one expected value of the at least one backoff time is at least one median of the at least one backoff time.

5. The computing device of claim 1, wherein the preamble time is a predefined value, and is defined in a communication standard.

6. The computing device of claim 1, wherein the SIFS time is a predefined value, and is defined in a communication standard.

7. The computing device of claim 1, wherein the ACK time is a predefined value, and is a time interval for receiving an ACK.

8. The computing device of claim 1, wherein the estimated packet error rate is a function of a plurality of packet error rates.

9. The computing device of claim 8, wherein the function is an average of the plurality of packet error rates.

10. A computing method for computing a packet transmission time to select a data rate to improve a performance of a computing device, comprising:
   storing an arbitration interframe space (AIFS) time, at least one expected value of at least one backoff time, a preamble time, a short interframe space (SIFS) time and an acknowledgement (ACK) time;
   computing a payload time according to a packet length and a packet rate;
   computing at least one packet transmission time according to the AIFS time, the at least one expected value of the at least one backoff time, the preamble time, the SIFS time, the ACK time and the payload time; and
   computing a total packet transmission time according to the at least one packet transmission time and an estimated packet error rate.

11. The computing method of claim 10, wherein the AIFS time is a waiting time interval before transmitting a packet, and is a predefined value.

12. The computing method of claim 10, wherein the at least one backoff time is at least one waiting time interval before transmitting a packet, and is at least one random variable with a probability distribution.

13. The computing method of claim 10, wherein the at least one expected value of the at least one backoff time is at least one median of the at least one backoff time.

14. The computing method of claim 10, wherein the preamble time is a predefined value, and is defined in a communication standard.

15. The computing method of claim 10, wherein the SIFS time is a predefined value, and is defined in a communication standard.

16. The computing method of claim 10, wherein the ACK time is a predefined value, and is a time interval for receiving an ACK.

17. The computing method of claim 10, wherein the estimated packet error rate is a function of a plurality of packet error rates.

18. The computing method of claim 17, wherein the function is an average of the plurality of packet error rates.

* * * * *